(No Model.)
H. G. M. HOWARD.
TWO WHEELED VEHICLE.
No. 372,676. Patented Nov. 8, 1887.
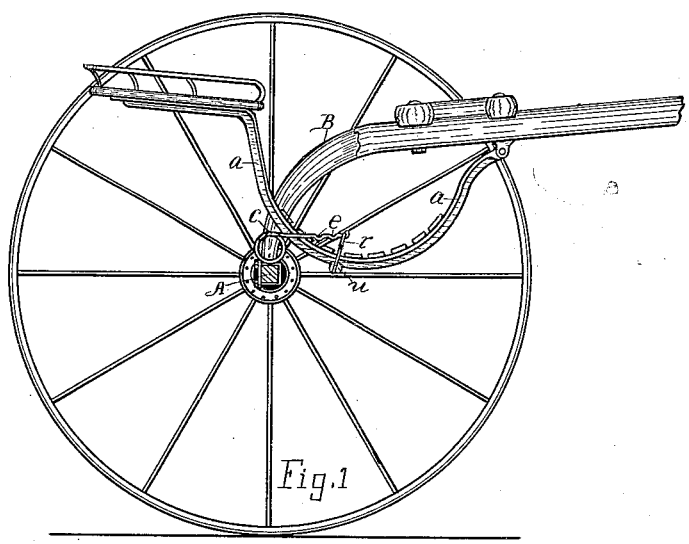
Fig. 1
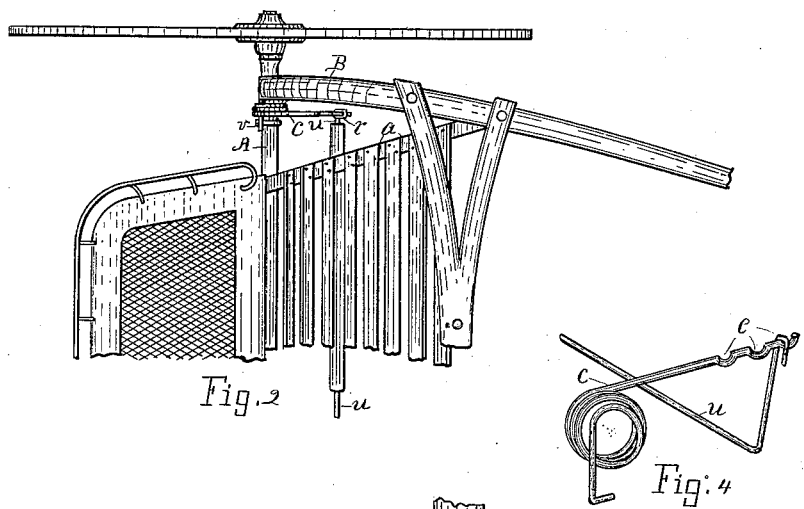
Fig. 2
Fig. 4
Witnesses.
John C. Perkins
Philip P. Schau
Fig. 3
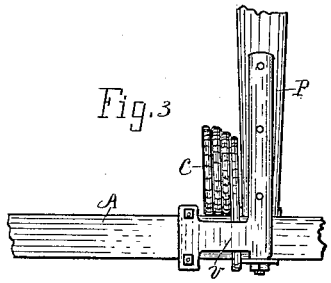
Inventor.
Henry G. M. Howard
By Lucius C. West
Atty.

UNITED STATES PATENT OFFICE.

HENRY G. M. HOWARD, OF KALAMAZOO, MICHIGAN.

TWO-WHEELED VEHICLE.

SPECIFICATION forming part of Letters Patent No. 372,676, dated November 8, 1887.

Application filed August 22, 1887. Serial No. 247,521. (No model.)

*To all whom it may concern:*

Be it known that I, HENRY G. M. HOWARD, a citizen of the United States, residing at Kalamazoo, county of Kalamazoo, State of Michigan, have invented a new and useful Two-Wheeled Vehicle, of which the following is a specification.

This invention has for its object the below-described and claimed improvements in that class of two-wheeled vehicles the forward end of the body of which is fulcrumed to the thills and the rear portion supported by springs on the axle.

Referring to the drawings forming a part of this specification, Figure 1 is a side elevation with one wheel removed; Fig. 2, a plan of vehicle with one side broken away; Fig. 3, a rear view of lettered details, enlarged; and Fig. 4 shows one spring in perspective.

Referring to the letters marked on the drawings, B are the thills, A the axle, and $a$ the seat-bars or fulcrumed body as heretofore constructed.

The spiral spring C rests on the axle in a horizontal position. It extends at one end of the spiral downward in the rear of the axle and catches under the same and is held by a clip-plate, $v$, or other suitable arrangement. The other end of the spiral extends horizontally forward and is provided with a series of kinks or notches, $e$, at the forward end.

At $u$ is a transverse rod beneath the body, having bearings which allow it to oscillate. Each end of the rod is bent to form a crank which rests in a notch, $e$, of the horizontal integral end of the spring. The terminal end of the crank $r$ extends downward, forming an open loop which straddles the end of the spring, thus preventing lateral displacement of said end of the spring, Fig. 4. As the body of the spiral rests on the axle, on the periphery of said spring, it is firmly supported, so that when the forward horizontal end of the spring is borne downward the spiral contracts without being borne away from its rest on the axle. When a very heavy person or two persons are in the seat, the strain comes on the small part of the spiral next to the thill, as well as on the larger part, and thus the spring is stiffest when bearing the heaviest burden. The action of the spring is further changed, or rather the leverage upon it, by adjusting the crank from one notch to another.

From the fact that the spring is rigidly attached to and supported by the axle, the normal position of the forward end of the spring is horizontal, as stated, when not supporting any weight. For this reason, by raising the body upward and then downward with a sudden movement (and from the fact that the crank seeks to assume a vertical position) the crank will fly backward into a rear notch, thus adjusting for a heavy person automatically and quickly. Both sides of the vehicle are alike. These springs may be used to support the body of a four-wheeled vehicle.

Having thus described my invention, what I claim is—

1. In combination, the axle, body, and the spiral springs horizontal and parallel with the axle, rigidly attached thereto, and the periphery of the body of said springs resting firmly upon said axle, substantially as set forth.

2. In combination, the axle, body, the spiral springs rigidly attached to and having their body resting on the axle horizontally and parallel thereto, and the crank-rod having the open-looped cranks resting adjustably in the notch of the integral forward extension of the springs, substantially as set forth.

3. The combination of the body having the crank-rod, the axle, and the springs rigidly attached to said axle, parallel thereto, having the periphery of the spiral resting upon the axle, the spiral next to the thills being smaller than the rest of the spirals, substantially as set forth.

In testimony of the foregoing I have hereunto subscribed my name in presence of two witnesses.

HENRY G. M. HOWARD.

Witnesses.
PHILLIP P. SCHAU,
GEO. D. B. HALL.